(12) United States Patent
Oswald

(10) Patent No.: US 8,974,067 B2
(45) Date of Patent: Mar. 10, 2015

(54) EXTERIOR MIRROR OF A MOTOR VEHICLE

(71) Applicant: Bayerische Motoren Werke Aktiengesellschaft, Munich (DE)

(72) Inventor: Roland Oswald, Wolnzach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/757,239

(22) Filed: Feb. 1, 2013

(65) Prior Publication Data

US 2013/0148219 A1 Jun. 13, 2013

Related U.S. Application Data

(63) Continuation of application No. PCT/EP2011/062167, filed on Jul. 15, 2011.

(30) Foreign Application Priority Data

Aug. 2, 2010 (DE) .......................... 10 2010 038 785

(51) Int. Cl.
*G02B 7/182* (2006.01)
*B60R 1/06* (2006.01)
*B62D 35/00* (2006.01)

(52) U.S. Cl.
CPC . *G02B 7/182* (2013.01); *B60R 1/06* (2013.01); *B62D 35/00* (2013.01)
USPC ........................................................ 359/871

(58) Field of Classification Search
USPC ............. 359/841, 843, 844, 871–881; 701/49
See application file for complete search history.

(56) References Cited

U.S. PATENT DOCUMENTS 4,439,013 A * 3/1984 Hagn et al. ..................... 359/509
5,155,625 A * 10/1992 Komatsu et al. .............. 359/512

FOREIGN PATENT DOCUMENTS

| DE | 1 028 898 B | 4/1958 |
| DE | 1 929 904 U | 12/1965 |
| DE | 2 310 429 A1 | 9/1974 |
| EP | 0 114 130 A1 | 7/1984 |
| WO | WO 97/37871 A1 | 10/1997 |

OTHER PUBLICATIONS

International Search Report dated Oct. 5, 2011 w/English translation (four (4) pages).
German Search Report dated Apr. 13, 2011 w/Partial English translation (nine (9) pages).

* cited by examiner

*Primary Examiner* — Jennifer L. Doak
(74) *Attorney, Agent, or Firm* — Crowell & Moring LLP

(57) ABSTRACT

An exterior mirror of a motor vehicle includes a mirror casing attached to a vehicle body wall via a mirror base and connected to an air guide ring by webs. The air guide ring surrounds a region of the mirror casing to form an air gap therebetween. The rear edge of the air guide ring is arranged at a distance behind the rear edge of the mirror casing. The air guide ring and the mirror base are firmly connected to one another or are at least fixed to one another. The mirror base can be arranged largely accurately in respect of position on the vehicle body wall by way of a position finding device and can be attached to the vehicle body wall by at least one attachment element.

19 Claims, 3 Drawing Sheets

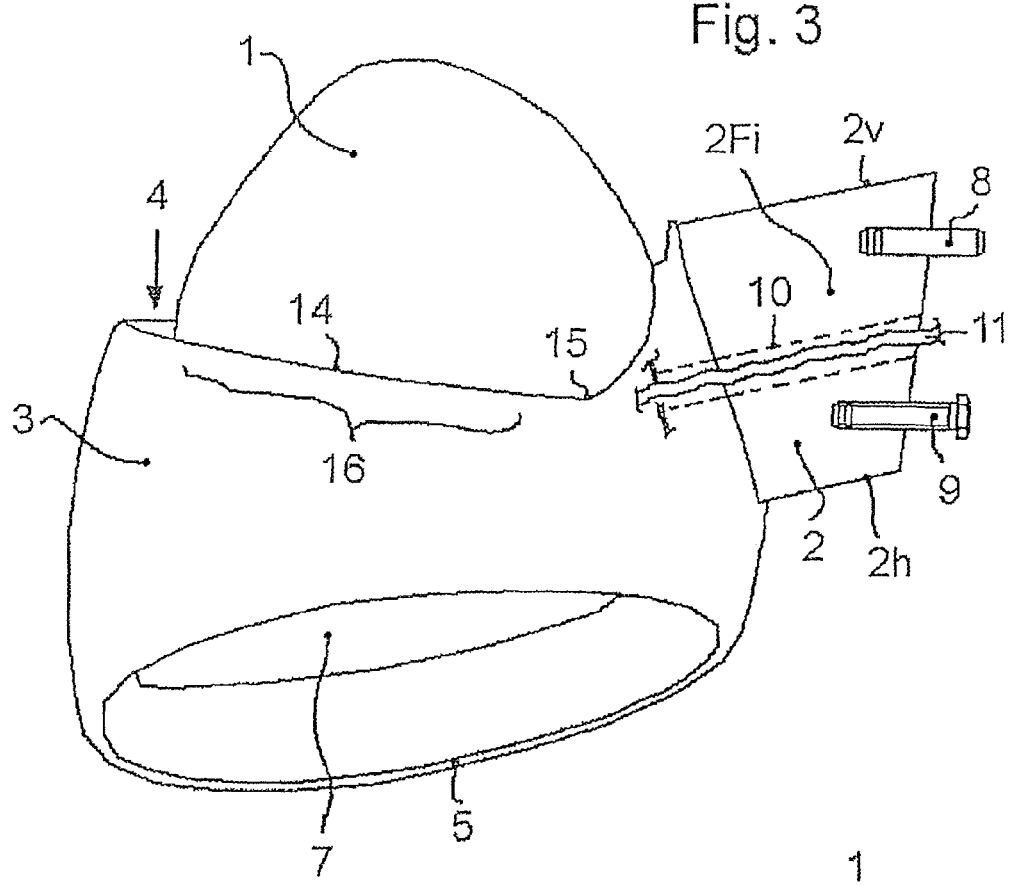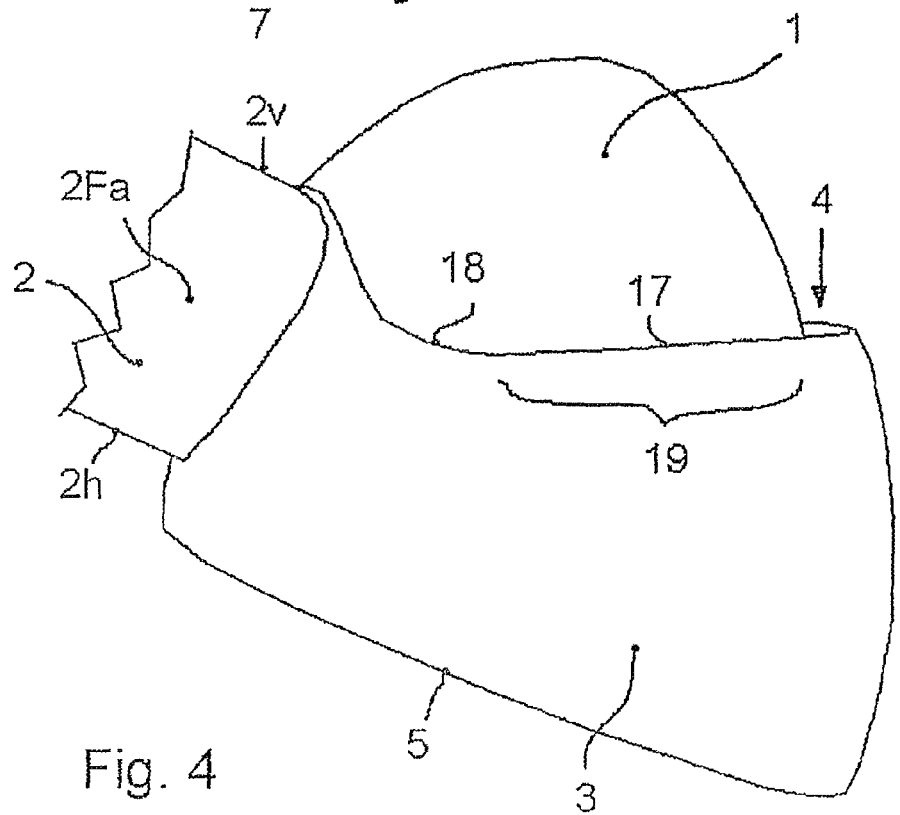

EXTERIOR MIRROR OF A MOTOR VEHICLE

CROSS REFERENCE TO RELATED APPLICATIONS

This application is a continuation of PCT International Application No. PCT/PCT/EP2011/062167, filed Jul. 15, 2011, which claims priority under 35 U.S.C. §119 from German Patent Application No. 10 2010 038 785.1, filed Aug. 2, 2010, the entire disclosures of which are herein expressly incorporated by reference.

BACKGROUND AND SUMMARY OF THE INVENTION

The invention relates to an exterior mirror of a motor vehicle and, more particularly, to an exterior mirror having a mirror casing which is fastened by way of a mirror base to a vehicle body wall and is connected, by way of webs, with an air guiding ring which, forming an air gap between the air guiding ring and the mirror casing, surrounds an area of the mirror casing.

An outside mirror of this type is disclosed in German Patent document DE-AS 1028898 in which an air guiding ring surrounds the mirror casing of the exterior mirror at a distance forming an air gap and is fixedly connected with the mirror casing by way of several webs. DE-AS 1028898 does not indicate how the mirror casing is fastened to a vehicle wall. It would appear that the rearview mirror or the mirror glass of the exterior mirror is fixedly connected with the mirror casing, as in the second embodiment of this publication. In the second embodiment, an extended air guiding ring and the mirror casing are connected in an angularly adjustable manner by way of a spring/screw connection with a mirror base fastened to the vehicle body, so that, as a result of an angular adjusting of the mirror casing, the rearview mirror fixedly connected with the mirror casing can be manually adjusted to an angular position favorable for viewing lateral traffic. So that, in the case of the first embodiment, in which the air guiding ring should be fixedly connected with the mirror casing, the rearview mirror will also be angularly adjustable, the mirror casing, as in the second embodiment in which the air guiding ring is extended, should be connected with a mirror base in an angularly adjustable manner by way of the spring/screw connection. The favorable angular position can be set individually and is a function of the height and longitudinal position of the vehicle seat, in which a person is situated who is sitting in the front in the passenger compartment of the vehicle and who is observing the lateral traffic by way of the exterior mirror. If the mirror casing is adjusted to a favorable angular position, it may be in an aerodynamically unfavorable position, in which an air current flowing, for example, through the air gap between the air guiding ring and the mirror casing causes air or whistling noises, and/or the aerodynamic drag of the exterior mirror is increased.

During the angular adjustment of the mirror casing in the second embodiment, the separately angularly adjustable air guiding ring may accidentally be adjusted to an angular position in which an air current flowing through the air gap between the air guiding ring and the mirror casing causes air or whistling noises and/or the aerodynamic drag of the air guiding ring is increased. It can also not be easily or not at all recognized whether the air guiding ring is in an aerodynamically favorable position. Pedestrians passing by the vehicle may thoughtlessly or accidentally misadjust the mirror casing and the air guiding ring jointly or, in the case of a separate arrangement, independently of one another, so that, in this case, the rearview mirror fastened to the mirror casing has to be readjusted to a favorable angular position by at least one angular setting of the mirror casing. Bodies, such as fairly large raindrops or hailstones, impacting on the air guiding ring and/or the mirror casing, for example, at a fairly high speed during the driving operation, may also possibly misadjust the air guiding ring or the mirror casing such that a viewing of the lateral traffic by way of the exterior mirror is not possible or is limited.

European Patent document EP 0 114 130 A1 describes a remote-controllable rearview mirror of a motor vehicle having a stationary mirror casing and a mirror which is connected on its circumference with sealing bellows, which permit an angular alignment of the mirror and which are fastened to the mirror casing at their other edge area. For example, the not watertight guiding of a cable through an opening in the front area of the mirror casing to a mirror adjusting device in the mirror casing and the aerodynamically unfavorable formation of the outer contour of the bellows demonstrate that the rearview mirror can only be an interior rearview mirror arranged in the passenger compartment of a motor vehicle.

It is an object of the invention to provide an exterior mirror of a motor vehicle which prevents or at least makes difficult an unintentional misadjusting of the rearview mirror arranged in the mirror casing, and which exterior mirror, in particular, is aerodynamically more favorable.

This and other objects are achieved by an exterior mirror of a motor vehicle having a mirror casing which is fastened by way of a mirror base to a vehicle body wall and is connected, by way of webs, with an air guiding ring which, forming an air gap between the air guiding ring and the mirror casing, surrounds an area of the mirror casing. The rear edge of the air guiding ring is arranged at a distance behind the rear edge of the mirror casing supporting a lateral rearview mirror. The air guiding ring and the mirror base are fixedly connected with one another or at least fixed with respect to one another and, by way of a position finding device, the mirror base is arrangeable in a largely precise position on the vehicle body wall and is fastenable by way of at least one fastening element to the vehicle body wall.

The exterior mirror of a motor vehicle according to the invention has a mirror casing which is fastened by way of a mirror base to a vehicle body wall, for example, to a vehicle door with which the mirror casing is fixedly connected. The mirror casing is fixedly connected, for example, by way of webs, with an air guiding ring which, forming an air gap between the air guiding ring and the mirror casing, surrounds an area of the mirror casing. By way of a position finding device, the mirror base is to be arranged in a largely precise position on the vehicle body wall and is to be fastened by way of at least one fastening element to the vehicle body wall.

The position finding device has, for example, at least two position finding elements, one position finding element, for example, being a positioning pin, which can be fitted through a passage opening at the vehicle body wall into a pin opening in the mirror base, or being a fastening screw, which can be screwed through a centering opening at the vehicle body wall into a thread in the mirror base. The position finding element may also be a centering element, which is constructed or arranged on the mirror base or the vehicle body wall and interacts with a counter-centering element on the other part, on the vehicle body wall or on the mirror base. The fastening element for fastening the mirror base to the vehicle body wall is, for example, a fastening screw which may also be a position finding element of the position finding device, for example, if the fastening screw, which is fitted through a screw opening at the vehicle body wall and is screwed into a thread in the mirror base, fixes the mirror base in a sufficiently precise position at least in areas at the vehicle body wall. A fastening screw and/or a positioning pin can be produced or purchased at reasonable cost.

A passage opening may be formed in the mirror base, which passage opening leads from a feeding opening in the vehicle body wall into the mirror casing, by way of which passage opening an electric circuit and/or at least one mirror adjusting element is connected with a manual or motor-driven adjusting device in the mirror casing, which, when activated, adjusts the rearview mirror. In this manner, the air guiding ring as well as the mirror casing are constantly fixedly connected with one another and with the mirror base, and the mirror base is arranged by way of the position finding device in a largely precise position on the vehicle body wall and, by way of at least one fastening element, is fastened to the vehicle body wall in a sufficiently stable manner. The air guiding ring and the mirror casing as well as the mirror base can be constructed and arranged in an aerodynamically favorable manner, whereby the aerodynamic drag of the exterior mirror is correspondingly reduced, and bothersome air and/or whistling noises of the air flowing around the exterior mirror and through the air gap are prevented or are reduced, for example, at fairly high driving speeds such, that they cannot be noticed or can hardly be noticed, and therefore, also in this case, acoustically cannot have a disturbing effect.

In the event of a, for example, accidental striking against the exterior mirror of the standing vehicle by a person walking by, neither the air guiding ring nor the mirror casing or the mirror base can be misadjusted. Also, bodies impacting on the air guiding ring or the mirror casing or the mirror base, such as fairly large raindrops or hailstones, in the driving operation cannot misadjust the air guiding ring and the mirror casing as well as the mirror base. A mirror glass, for example, forming the rearview mirror of the exterior mirror may be connected by way of an electric circuit and/or at least one mirror adjusting element with a manual or motor-driven adjusting device in the mirror casing, which, when activated, adjusts the rearview mirror. The rearview mirror or the mirror glass is arranged in the air guiding ring in a protected manner, so that there is no risk that persons carelessly walking past the standing vehicle accidentally misadjust the rearview mirror or the mirror glass of the exterior mirror. Should, for example, a person strike the exterior mirror from the rear, if at all, the person would only come in contact with the rearward edge area of the stationary air guiding ring which preferably protrudes toward the rear beyond the rear edge area of the mirror casing and the rearview mirror and is preferably rounded in order to prevent injury in the event of a contact with a person.

Between the rear edge of the mirror casing and the circumferential edge of the rearview mirror, bellows may be arranged which, on the one side, are fastened or supported on, for example, clipped to the mirror casing and, on the other side, on the circumferential edge of the rearview mirror. The aerodynamically unfavorable contour of the bellows does not have, or hardly has, an acoustically unfavorable effect because the air current flowing past is limited by the air gap between the air guiding ring and the mirror casing and can be aerodynamically optimized by a corresponding design of the air gap. The bellows permit an arrangement and a construction of the rearview mirror in which the mirror casing and the bellows, from the direction of the viewing side of the rearview mirror, are completely covered by the rearview mirror and the air gap is not or is hardly visible. In a simple manner, a view through the air gap can be prevented in that the wall of the air guiding ring bounding the air gap and the wall of the mirror casing bounding the air gap have a construction that is correspondingly curved in the same direction, which walls may have the same distance or different distances at different places. The rear edge of the air guiding ring is arranged, for example, at a distance behind the rear edge of the mirror casing supporting a lateral rearview mirror.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a top view of the exterior mirror situated approximately in its installation position;

FIG. 4 is a bottom view of the exterior mirror situated approximately in its installation position.

DETAILED DESCRIPTION OF THE DRAWINGS

Figure 1:
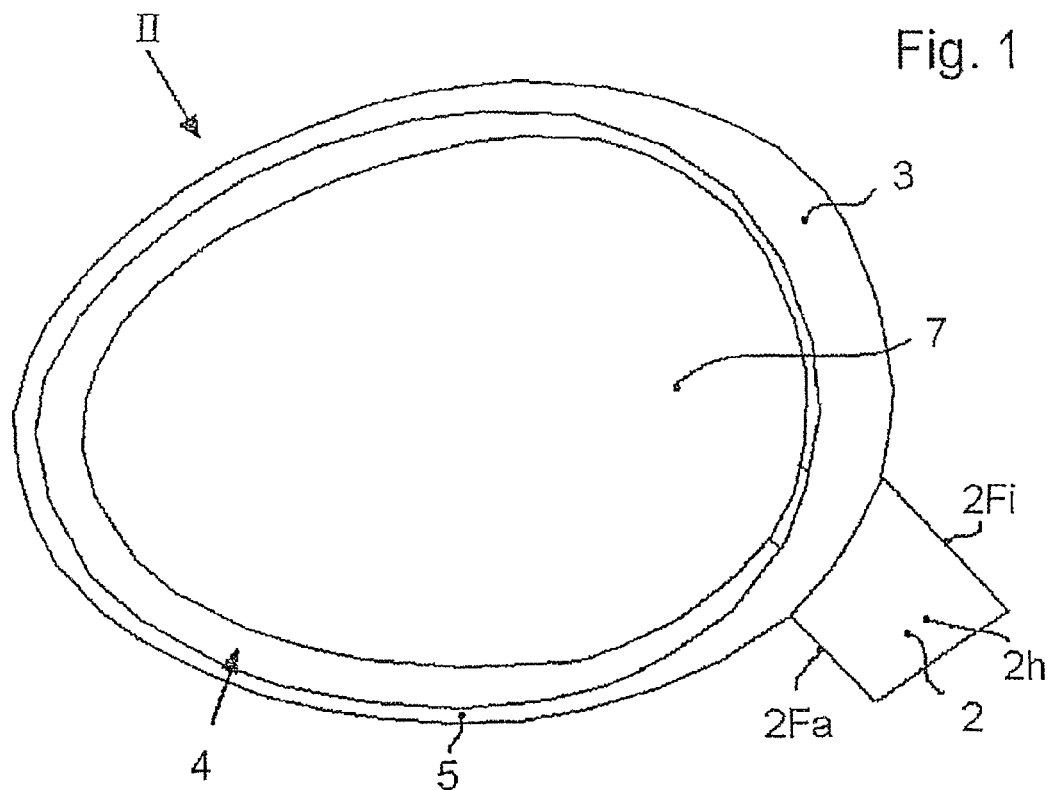
FIG. 1 is a simplified view of the mirror surface of an exterior mirror usable on a motor vehicle in its approximate mounting position.

In FIG. 1, an exterior mirror of a motor vehicle is illustrated in a simplified manner approximately in its mounting position on the exterior side of a motor vehicle, which exterior mirror has a mirror casing 1 only partially visible in FIGS. 2 to 5. The mirror casing 1 is fastened to a vehicle door of the motor vehicle by way of a mirror base 2 partially illustrated in FIGS. 1, 3 and 4 and, by way of webs that are not shown, is fixedly connected with an air guiding ring 3. The air guiding ring 3, while forming an air gap 4 between the air guiding ring 3 and the mirror casing 1, surrounds an area of the mirror casing 1.

The rear edge 5 of the air guiding ring 3 is arranged at a distance behind the rear edge 6 of the mirror casing 1. The rear edge 6 of the mirror casing 1 supports a lateral rearview mirror 7. The air guiding ring 3 and the mirror base 2 are fixedly connected with one another.

The mirror base 2 is fastened to the vehicle door by way of a positioning pin 8 illustrated in FIG. 3 and by way of a fastening screw 9 also illustrated in FIG. 3. In the mirror base 2, a passage opening 10 is constructed which leads from a feed opening (not shown) in the vehicle door through the air guiding ring 3 and a web (not shown) into the mirror casing 1. The passage opening 10 is shown in FIG. 3 in a simplified manner by a broken outline. By way of the passage opening 10, a power circuit 11 visible in FIG. 3 is connected with a motor-driven adjusting device (not shown) in the mirror casing 1, which, when activated, adjusts the rearview mirror 7 to a desired angular position about one or more real or virtual pivoting axes.

The rearview mirror 7 angularly set to a center position, in each case, in a normal driving direction of the motor vehicle is arranged at a distance behind the rear edge 6 of the mirror casing and at a distance in front of the rear edge 5 of the air guiding ring 3. As illustrated particularly in FIG. 5, the rearview mirror 7 has a mirror surface 12 that corresponds approximately to the contour of the rear edge 6 of the mirror casing 1.

Figure 5:
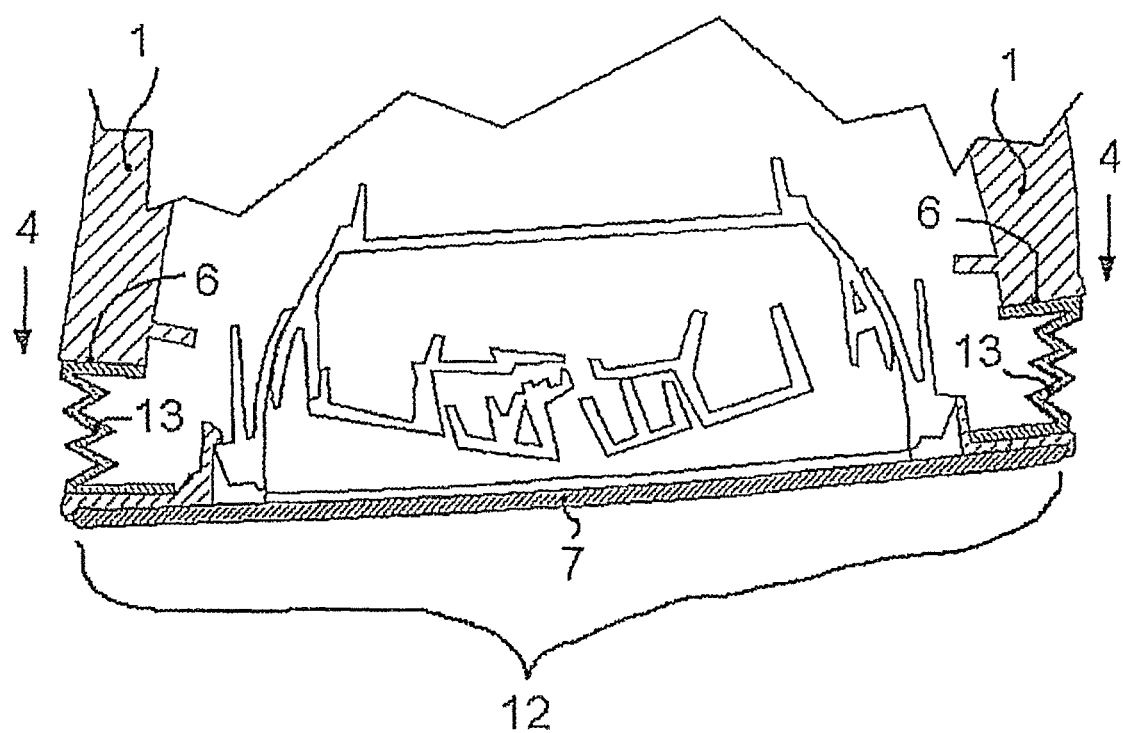
FIG. 5 is a simplified cross-sectional view of the forward area of the mirror casing of the exterior mirror illustrated in the preceding figures.

FIG. 5 indicates that bellows 13 are arranged between the rear edge 6 of the mirror casing 1 and the circumferential edge of the rearview mirror 7. The bellows 13 are fastened or supported, for example, clipped, to the mirror casing 1, on the one side, and to the circumferential edge of the rearview mirror 7, on the other side.

With respect to FIGS. 3 and 4, it should be noted that, in the embodiment, the mirror base 2 has at its front edge 2v an approximately semicylindrical construction with a large radius, and has an approximately semicylindrical construction with a small radius at its rear edge 2h. The approximately semicylindrical front edge 2v of the mirror base 2 and the approximately semicylindrical rear edge 2h of the mirror base 2 are laterally inside and outside in each case connected by way of an approximately planar surface part 2Fi and 2Fa respectively.

FIGS. 3 and 4 also indicate that, at its upper front edge area, the air guiding ring 3 has a notch-shaped recess 14 with a rounded notch root 15 and, on its lower front edge area, has a notch-shaped recess 17 with a rounded notch root 18. In the embodiment, the area 16 of the notch-shaped recess 14 adjoining the notch root 15 laterally on the outside has an approximately straight construction and, laterally to the outside and directed toward the front, is arranged at an acute angle with respect to an ideal transverse axis of the vehicle. In a manner comparable thereto, in the embodiment, the area 19 of the notch-shaped recess 17 adjoining the notch root 18 laterally on the outside has an approximately straight construction and, laterally to the outside and directed toward the front, is arranged at an acute angle with respect to an ideal transverse axis of the vehicle. A comparison of FIGS. 3 and 4 indicates that, in the embodiment, the upper distance of the notch root 15 from the rear edge area 5 of the air guiding ring 3 is smaller than the lower distance of the notch root 18 from the rear edge area 5 of the air guiding ring 3.

Figure 2:
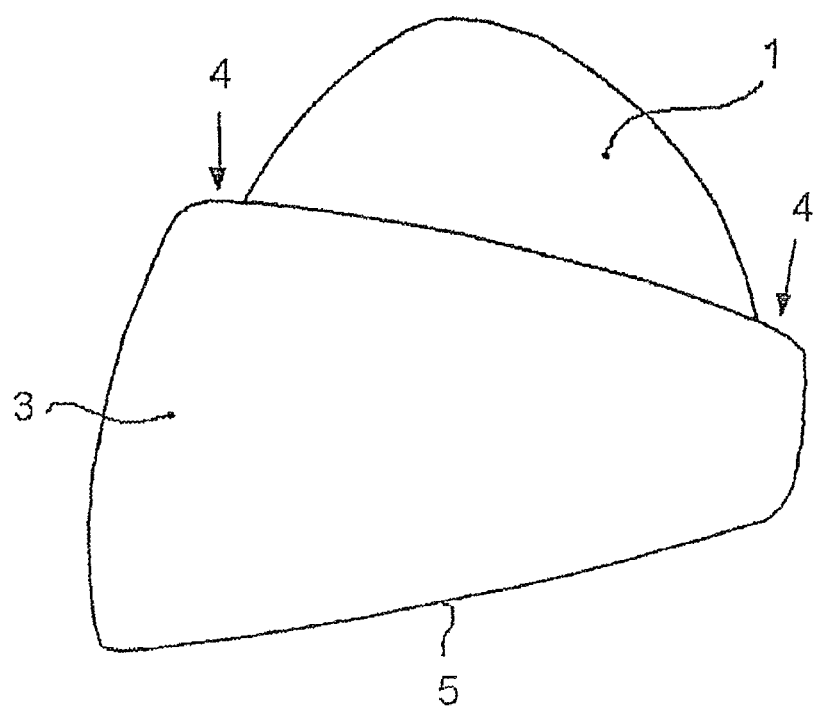
FIG. 2 is a view of the exterior mirror in FIG. 1 viewed in the direction of the arrow II in FIG. 1.

FIGS. 2, 3 and 4 indicate that the mirror casing 1 has a convexly curved construction in the upward, downward and forward directions. The air guiding ring 3 is adapted at least in areas or as a whole in the area of the air gap 4 to the contour of the mirror casing 1.

The invention can, of course, vary from the single embodiment. The number of webs by way of which the air guiding ring supports the mirror casing can be arbitrarily defined per se. By way of a position finding device, the mirror base is to be arranged largely in a precise position on the vehicle body wall and is to be fastened to the vehicle body wall by way of at least one fastening element. The position finding device may have many different constructions and have, for example, at least two position finding elements. A position finding element is, for example, a positioning pin fitted through a passage opening at the vehicle body wall into a pin opening in the mirror base or a fastening screw which can be screwed through a centering opening at the vehicle wall into a thread in the mirror base. The position finding element may also have a centering element constructed or arranged at the mirror base or at the vehicle body wall, which centering element interacts with a countercentering element at the other part, at the vehicle body wall or at the mirror base. The fastening element may be constructed very differently, for example, by means of a fastening screw 9. The fastening screw may also be a position finding element of the position finding device. The vehicle body wall may be any suitable surface of the vehicle, for example, a lateral front vehicle door. In the mirror base, a passage opening may be formed which leads from a feed opening in the vehicle door through the air guiding ring and a web into the mirror casing, by way of which passage opening, a power circuit and/or at least one mirror adjusting element is connected with a manual or motor-driven adjusting device in the mirror casing. The adjusting device, when activated, will adjust the rearview mirror.

The rearview mirror may also have a mirror surface deviating from the contour of the rear edge of the mirror casing. The use of bellows between the rear edge of the mirror casing and the circumferential edge of the rearview mirror may also be eliminated or be replaced by another covering. The contour of the mirror base may be constructed to differ from the embodiment. The notch-shaped recesses in the contour of the air guiding ring provided in the embodiment may be eliminated individually or altogether or may be formed by other contour shapes. The mirror casing may have a shape that deviates from the embodiment with flat and/or curved interior and/or exterior surfaces at least in areas.

The air guiding ring may extend, for example, approximately over 30 to 70% of the length of the mirror casing in the driving direction of the motor vehicle. In the central angular position of the rearview mirror, the rear edge of the air guiding ring is arranged, for example, approximately 5 to 30 mm behind the rearview mirror. In the area of the air gap, the distance between the air guiding ring and the adjacent surface of the mirror casing may, for example, be approximately between 5 to 10 mm. The air guiding ring may, for example, have a convex radius of at least 2.5 mm with respect to the environment at its front and rear edge area. The mirror casing may have at least two mirror casing parts which are detachably connected with one another, for example, by way of a clipped connection, one of the mirror casing parts being fixedly connected with the mirror base. This facilitates, for example, a mounting and demounting of components arranged in the mirror casing when, for example, only a mirror casing part not connected with the mirror base is removed from the mirror casing part connected with the mirror base. The air guiding ring and the mirror base may be fixedly connected with one another or at least be fixed with respect to one another. The fixing can take place such that, in the event of a fairly high force acting upon the mirror casing and/or the air guiding ring, for example, as a result of an accident, the mirror casing together with the air guiding ring can flexibly pivot with respect to at least one area of the mirror base.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An exterior mirror of a motor vehicle, comprising:
an exterior mirror casing;
a mirror base by which the mirror casing is fastenable to a body wall of the motor vehicle;
an exterior air guiding ring co-located with the exterior mirror casing, the air guiding ring being arranged to surround an area of the mirror casing and to be connected to the mirror casing via one or more webs to form an air gap between the air guiding ring and the mirror casing;
a position finding device configured to arrange the mirror base in a precise position on the body wall, wherein:
a rear edge of the air guiding ring is arranged at a distance behind a rear edge of the mirror casing supporting a side rearview mirror,
the air guiding ring and the mirror base are fixed relative to one another, and the mirror base is fastenable to the body wall by way of at least one fastening element.

2. The exterior mirror according to claim 1, wherein the position finding device comprises at least two position finding elements.

3. The exterior mirror according to claim 2, wherein one position finding element is one of:
(a) a positioning pin fitted through a passage opening at the body wall into a pin opening in the mirror base;
(b) a fastening screw configured to be screwable through a centering opening at the body wall into a threaded portion in the mirror base; and
(c) a centering element configured at the mirror base or the body wall for interacting with a counter-centering element at the body wall or the mirror base.

4. The exterior mirror according to claim 1, wherein the fastening element is a fastening screw.

5. The exterior mirror according to claim 1, wherein the fastening element is a fastening screw forming a position finding element of the position finding device.

6. The exterior mirror according to claim 1, wherein the mirror base has a passage opening leading from a feed opening in the body wall of the motor vehicle through the air guiding ring and a web into the mirror casing; and
wherein at least one of a power circuit and a mirror adjusting element couples with an adjusting device in the mirror casing via the passage opening, the adjusting device being operatively configured to adjust the side rearview mirror.

7. The exterior mirror according to claim 1, wherein, in an angularly set center position, the side rearview mirror is located at a distance behind the rear edge of the mirror casing and at a distance in front of the rear edge of the air guiding ring.

8. The exterior mirror according to claim 1, wherein the side rearview mirror has a mirror surface that corresponds approximately to a contour of the rear edge of the mirror casing.

9. The exterior mirror according to claim 1, wherein between the rear edge of the mirror casing and a circumferential edge of the side rearview mirror, bellows are operatively arranged to close the area between the rear edge of the mirror casing and the circumferential edge of the side rearview mirror.

10. The exterior mirror according to claim 1, wherein a front edge of the mirror base has an approximately semicylindrical configuration with a large radius and, on a rear edge, has an approximately semicylindrical construction with a smaller radius.

11. The exterior mirror according to claim 10, wherein the approximately semicylindrical front edge of the mirror base and the approximately semicylindrical rear edge of the mirror base are connected laterally via surface parts that are convexly or approximately planarly shaped with respect to an environment.

12. The exterior mirror according to claim 1, wherein in at least one of an upper front edge area and a lower front edge area, the air guiding ring has a notch-shaped recess with a rounded notch root.

13. The exterior mirror according to claim 12, wherein an area of the notch-shaped recess adjoining the rounded notch root laterally on an outside has an approximately straight construction; and
wherein laterally to the outside and directed toward a front, the area having the approximately straight construction is arranged at an acute angle with respect to an ideal transverse axis of the motor vehicle.

14. The exterior mirror according to claim 13, wherein the mirror casing has a convexly curved configuration in an upward, a downward, and a forward direction; and
wherein the air guiding ring is adapted at least in areas of the air gap to a contour of the mirror casing.

15. The exterior mirror according to claim 1, wherein the air guiding ring extends approximately over 30 to 70% of a length of the mirror casing in a driving direction of the motor vehicle.

16. The exterior mirror according to claim 15, wherein in a central angular position of the side rearview mirror, the rear edge of the air guiding ring is arranged approximately 5 to 30 mm behind the side rearview mirror.

17. The exterior mirror according to claim 16, wherein the air gap has a distance between the air guiding ring and an adjacent surface of the mirror casing of approximately 5 to 10 mm.

18. The exterior mirror according to claim 17, wherein in front and rear edge areas, the air guiding ring has a convex radius of at least 2.5 mm with respect to the environment.

19. The exterior mirror according to claim 1, wherein the mirror casing comprises two mirror casing parts detachably connected with one another, at least one of the two mirror casing parts being fixedly connected with the mirror base.

* * * * *